Sept. 25, 1923.

M. HARRIS

COMBINED HOE AND RAKE TOOL

Filed Aug. 22, 1921

1,469,144

INVENTOR
Micajah Harris
BY
ATTORNEY

Patented Sept. 25, 1923.

1,469,144

UNITED STATES PATENT OFFICE.

MICAJAH HARRIS, OF LITCHFIELD, CONNECTICUT.

COMBINED HOE AND RAKE TOOL.

Application filed August 22, 1921. Serial No. 494,210.

*To all whom it may concern:*

Be it known that I, MICAJAH HARRIS, a citizen of the United States, and a resident of Litchfield, Connecticut, in the county of Litchfield and State of Connecticut, have invented certain new and useful Improvements in Combined Hoe and Rake Tools, of which the following is a specification.

This invention relates generally to improvements in implements and particularly to the kind for farm or garden use.

The object of my said invention is the provision of a farm or garden implement which by virtue of its general form and construction is possessed of increased capacity, the said general form and construction permitting the free passage of dirt and thereby adapting the implement to be more efficiently operated against and in the ground.

To the attainment of the foregoing, the invention consists in the improvement as hereinafter described and definitely claimed.

Figure 1:
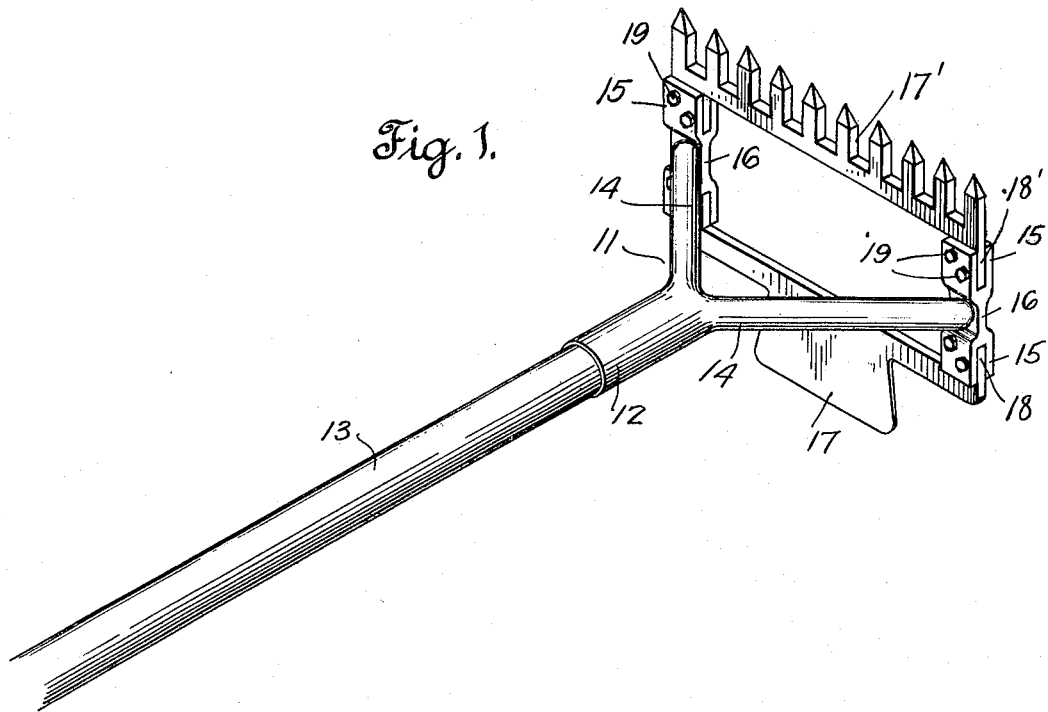
Figure 1 is a perspective of a combined hoe and rake implement made in accordance with the invention.

Referring now to the drawing in detail numeral 11 indicates an open frame, preferably V-shaped and provided with diverging arms 14 and adapted for appropriate connection to a handle. In the preferred embodiment of the invention the stem or shank portion 12 of said open frame is adapted to receive a suitable wooden handle 13.

Permanently secured at the extreme ends of arms 14 and perpendicular thereto are heads 15 with intermediate portions 16 and bifurcated end portions. These heads are adapted to removably engage the hoe and rake blades 17 and 17' respectively, at the lug portions 18 and 18' respectively. These heads are preferably made integral with the frame 11.

The preferably removable blades 17 and 17' are provided with perforations at their lug portions 18 and 18' which aline with similar perforations formed in clamps 15. These blades are secured to the frame 11 by means of suitable bolts 19.

If one of the blades become worn or broken it can easily be removed and another placed in its stead.

Figure 2:
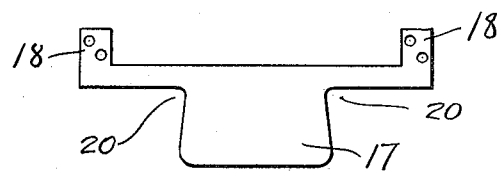
Figure 2 is an elevational view of one of the removable blades per se.

Hoe blade 17 is preferably shaped as shown in Figure 2, the ends of blade 20 being cut away to conform to a practical width. However since this blade is removable a blade of any desired width may be substituted therefor.

It will be apparent from the foregoing that my novel implement comprises in combination with the open frame 11, an open frame disposed at right angles to the open frame 11 and formed by the heads 15 and the blades 17 and 17', the blades 17 and 17' being disposed at opposite sides of the plane of the frame 11 and being separated between the heads 15 by an intervening space. By virtue of the two open frames relatively arranged as indicated it will be manifest that the implement provides for the free passage of earth when either of the blades is struck against and forced into the ground, and therefore the implement is highly efficient and requires but little effort for its proper manipulation.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having thus described my invention and set forth its construction and application, what I claim as new and desire to secure by Letters Patent, is:—

An implement comprising an open frame with arms the ends of which are spaced apart, upright heads joined at intermediate points in their lengths to the ends of said arms, and blades joined at their inner edges and ends to the ends of the heads, said blades being arranged at opposite sides of and in spaced relation to the plane of the frame and forming in association with the heads a second open frame in full communication with the first-named frame, and the said heads being provided with bifurcated end portions, and the blades being provided with lugs disposed in the bifurcations of the heads and connected thereto.

Signed at Litchfield, in the county of Litchfield and State of Connecticut, this 30th day of July, A. D., 1921.

MICAJAH HARRIS.